United States Patent
Kuze et al.

(10) Patent No.: US 10,639,984 B2
(45) Date of Patent: May 5, 2020

(54) CONTROL SYSTEM FOR VEHICLE

(71) Applicant: TOYOTA JIDOSHA KABUSHIKI KAISHA, Toyota-shi, Aichi (JP)

(72) Inventors: Yasuhiro Kuze, Numazu (JP); Naoya Takagi, Mishima (JP); Teruhiko Miyake, Sunto-gun (JP); Naoto Kato, Susono (JP); Takayoshi Kawai, Susono (JP); Teppei Yoshioka, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 10 days.

(21) Appl. No.: 16/180,117

(22) Filed: Nov. 5, 2018

(65) Prior Publication Data

US 2019/0135103 A1   May 9, 2019

(30) Foreign Application Priority Data

Nov. 8, 2017   (JP) .................. 2017-215734

(51) Int. Cl.
*B60K 6/52*   (2007.10)
*B60K 6/442*   (2007.10)
*B60W 10/08*   (2006.01)
*B60K 6/547*   (2007.10)
*B60W 10/02*   (2006.01)
*B60K 6/543*   (2007.10)

(52) U.S. Cl.
CPC .............. *B60K 6/52* (2013.01); *B60K 6/442* (2013.01); *B60K 6/543* (2013.01); *B60K 6/547* (2013.01); *B60W 10/02* (2013.01); *B60W 10/08* (2013.01)

(58) Field of Classification Search
None
See application file for complete search history.

(56) References Cited

U.S. PATENT DOCUMENTS

| | | | | |
|---|---|---|---|---|
| 8,013,565 B2* | 9/2011 | Miura | ....................... | G01K 7/42 318/473 |
| 8,089,234 B2* | 1/2012 | Takizawa | ................ | B60L 15/00 318/139 |
| 8,704,466 B2* | 4/2014 | Maruyama | .............. | H02P 29/60 318/362 |
| 8,922,152 B2* | 12/2014 | Kawamura | ........ | H03K 17/0828 180/65.21 |
| 9,806,663 B2* | 10/2017 | He | .......... | H02P 25/03 |
| 10,084,305 B2* | 9/2018 | Michishita | ............... | H02H 5/04 |
| 10,183,581 B2* | 1/2019 | Ichikawa | .................. | B60L 3/00 |
| 10,351,142 B2* | 7/2019 | Fukaya | ............... | B60W 50/029 |

FOREIGN PATENT DOCUMENTS

JP   3964446 B2   8/2007

* cited by examiner

*Primary Examiner* — Dirk Wright
(74) *Attorney, Agent, or Firm* — Sughrue Mion, PLLC

(57) ABSTRACT

A vehicle control system, in which that maintains a reaction force against the backward movement of a vehicle while preventing an overheating of a motor due to phase lock of the motor. When a thermal load on a specific phase of the motor exceeds a threshold value, a controller execute a phase shift control to reduce a thermal load on a specific phase of the motor by changing a rotational angle of the motor, while interrupting torque transmission between the motor and wheels and generating the torque to stop the vehicle by the actuator.

10 Claims, 12 Drawing Sheets

CONTROL SYSTEM FOR VEHICLE

CROSS REFERENCE TO RELATED APPLICATIONS

The present disclosure claims the benefit of Japanese Patent Application No. 2017-215734 filed on Nov. 8, 2017 with the Japanese Patent Office, the disclosure of which are incorporated herein by reference in its entirety.

BACKGROUND

Field of the Disclosure

Embodiments of the present disclosure relate to the art of a control system for a vehicle in which a prime mover includes at least a motor.

Discussion of the Related Art

Japanese patent No. 3964446 describes a driving force controller for an electric vehicle having a motor as a prime mover. According to the teachings of Japanese patent No. 3964446, when the motor is in a stall state in which the motor generates a torque but does not rotate to prevent a backward movement of the vehicle e.g., on a downslope, the controller prevents a reduction in an output torque of the motor by preventing an overheating of an electrical power source such as the motor and an inverter. To this end, the driving force controller taught by Japanese patent No. 3964446 is configured to temporarily reduce a engagement force of a clutch for transmitting the torque of the motor to derive wheels when a continuous power supply time of the motor exceeds a predetermined period of time. Specifically, when the controller predicts an occurrence of the overheating of the motor or the inverter due to excessive supply to a predetermined phase, the controller allows the motor to rotate by reducing the engagement force of the clutch to shift an energizing phase. After thus shifting the energizing phase of the motor, the engagement force of the clutch is increased again, that is, the clutch is engaged again. Thus, an overheating of the motor and the inverter may be caused by so-called a "phase-lock", and the motor and the inverter may be damaged by such overheating.

As described above, the backward movement of the vehicle on an uphill road may be prevented by establishing a reaction force against the backward movement of the vehicle by the motor. In this situation, if a thermal load concentrates only on a specific phase of the motor in the stall state, the overheating of the motor may be prevented without reducing (a command value of) current supply to the motor by shifting the energizing phase of the motor.

However, according to the teachings of Japanese patent No. 3964446, the engagement force of the clutch is reduced temporarily when shifting the energizing phase of the motor, therefore, a motor torque drops temporarily when reducing the engagement force of the clutch. For this reason, when shifting the energizing phase of the motor, the vehicle may be moved backwardly by gravity. In addition, a complicated control is required in this situation to keep the clutch in partial engagement while causing a slip. As described, in order to prevent such backward movement of the vehicle on a slope, the engagement force of the clutch is reduced temporarily while increasing the motor torque. To this end, a complicated control is required to control the clutch and the motor cooperatively, and the vehicle may be moved backwardly by gravity or moved ahead by depressing an accelerator pedal excessively. In order to solve such technical problem, an improved control system is required to control the reaction force against the backward movement of the vehicle on a slope while preventing an overheating of the motor.

SUMMARY

Aspects of embodiments of the present disclosure have been conceived noting the foregoing technical problems, and it is therefore an object of the present disclosure to provide a vehicle control system that maintains a reaction force against the backward movement of the vehicle while preventing an overheating of the motor due to phase lock of the motor.

The control system according to the embodiment of the present disclosure is applied to a vehicle comprising: a first electric motor having a plurality of phases, that generates a torque by controlling a current value applied to each of the phases in accordance with a rotational angle; an actuator that generates a torque to stop the vehicle; and a selective transmission device that selectively transmits an output torque of the first electric motor to drive wheels and interrupts torque transmission between the first electric motor and the drive wheels. In order to achieve the above-explained objective, according to the embodiment of the present disclosure, a controller is configured to execute a phase shift control to reduce a thermal load on a specific phase of the first electric motor by changing the rotational angle of the first electric motor, when the thermal load on the specific phase exceeds a threshold value as a result of generating the torque to stop the vehicle by the first electric motor while stopping a rotation of the first electric motor. Specifically, the phase shift control is executed while interrupting torque transmission between the first electric motor and the drive wheels by the selective transmission device, and generating the torque to stop the vehicle by the actuator.

In a non-limiting embodiment, the actuator may include a second electric motor that generates the torque to stop the vehicle.

In a non-limiting embodiment, the selective transmission device may include a first clutch that is engaged to transmit the torque of the first electric motor to drive wheels, and that is disengaged to interrupt torque transmission between the first electric motor and the drive wheels. The vehicle may further comprise a second clutch that is engaged to transmit the torque of the second electric motor to drive wheels, and that is disengaged to interrupt torque transmission between the second electric motor and the drive wheels. The controller may be further configured to execute the phase shift control while engaging the second clutch and disengaging the first clutch.

In a non-limiting embodiment, the vehicle may further comprise an engine connected to the second electric motor. The second electric motor may stop the vehicle by generating a torque in an amount calculated by subtracting a friction torque of the engine from the torque required to stop the vehicle.

In a non-limiting embodiment, the controller may be further configured to stop fuel supply to the engine during execution of the phase shift control.

In a non-limiting embodiment, the controller may be further configured to control the selective transmission device to transmit the torque of the first electric motor to the drive wheels again after executing the phase shift control.

In a non-limiting embodiment, the threshold value of the thermal load includes a threshold value of an integrated current value of the first electric motor determined in accordance with a rotational angle of the first electric motor.

In a non-limiting embodiment, the controller may be further configured to compare a current integrated current value of the first electric motor to the threshold value, and determine that the thermal load on the first electric motor is greater than the threshold value when the current integrated current value is greater than the threshold value.

In a non-limiting embodiment, each of the phases may individually include a first switching element that controls a current value supplied to one of terminals, and a second switching element that controls a current value supplied to the other terminal. The threshold value may be set based on a maximum allowable value of the thermal load on any one of the first switching element and the second switching element.

In a non-limiting embodiment, the phase shift control may include a control to adjust the rotational angle of the first electric motor such that a switching element to which the current is supplied is shifted between the first switching element and the second switching element.

Thus, when the thermal load on the specific phase of the first electric exceeds a threshold value, the controller executes the phase shift control to reduce the thermal load on the phase being energized by changing the rotational angle of the first electric motor. The controller is configured to execute the phase shift control while interrupting torque transmission between the first electric motor and the drive wheels by the selective transmission device, and generating the torque to stop the vehicle by the actuator.

According to the embodiment of the present disclosure, therefore, the first motor can be prevented from being damaged thermally even when stopping the vehicle on a slope by the output torque of the first motor.

According to the embodiment of the present disclosure, the vehicle may be stopped on the slope by the torque of the actuator during execution of the phase shift control. For this reason, the torque stopping the vehicle on the slope will not be reduced even during execution of the phase shift control so that the vehicle is not gravitated on the slope.

According to the embodiment, the vehicle may be stopped on the slope by the torque of the actuator or the motor without requiring a complicated control of the clutches to cause a slip.

According to the embodiment, the first motor is allowed to be cooled by generating the torque to stop the vehicle by the actuator during execution of the phase shift control.

According to the embodiment, the vehicle stopping on the slope may be launched by the second motor when an accelerator pedal is further depressed even during execution of the phase shift control.

According to the embodiment, fuel supply to the engine may be stopped during execution of the phase shift control. Therefore, the engine will not be started during execution of the phase shift control, and generation of vibration as might be caused to start the engine can be prevented. In addition, the fuel can be saves and exhaust gas will not be emitted.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Embodiments of the present disclosure will now be explained with reference to the accompanying drawings. Note that the embodiments shown below are merely examples of cases where the present disclosure has been actualized, and do not limit the present disclosure.

Figure 1:
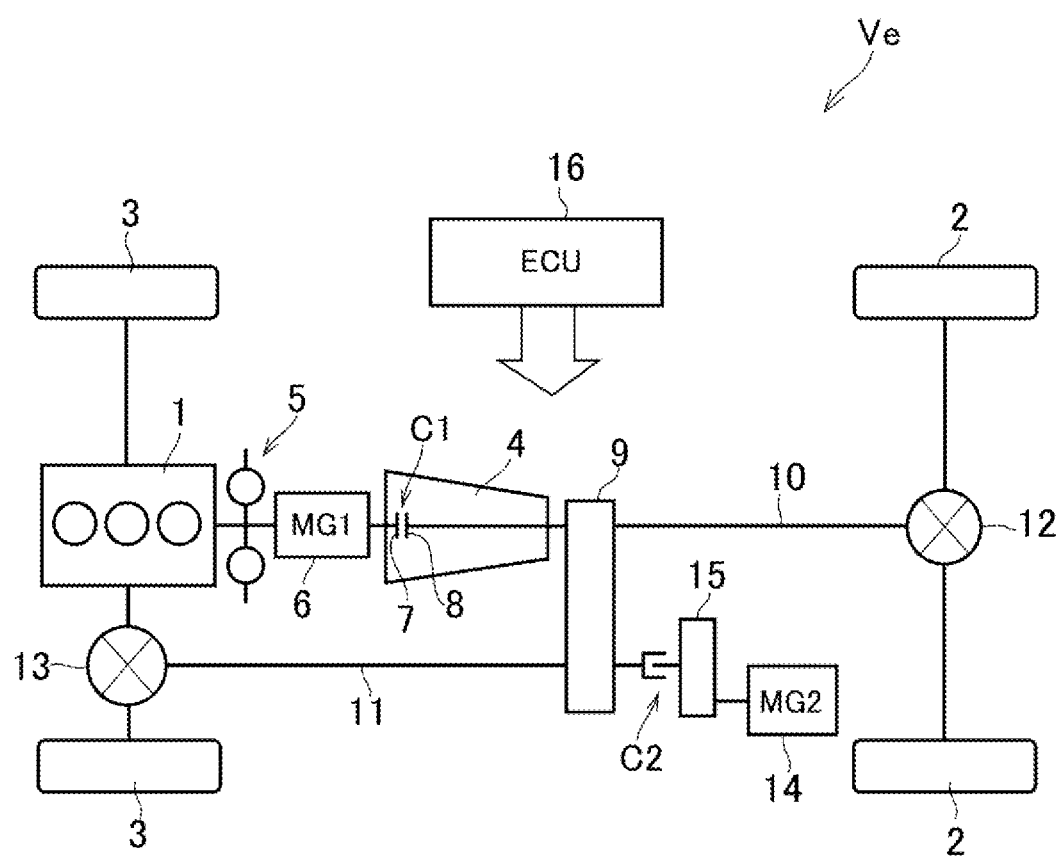
FIG. 1 is a schematic illustration showing one example of a powertrain of a hybrid vehicle to which the control system according to the embodiment of the present disclosure is applied.

The vehicle control system according to at least one embodiment of the present disclosure may be applied to a hybrid vehicle powered by an engine and a motor(s), and an electric vehicle powered by the motor(s). Turning now to FIG. 1, there is shown one example of a powertrain of a four-wheel drive layout (i.e., 4WD or AWD) hybrid vehicle comprising an engine and two motors to which the vehicle control system is applied.

Specifically, a vehicle Ve shown in FIG. 1 is an FR (i.e., front-engine rear-drive layout) based four-wheel drive vehicle. In the vehicle shown in FIG. 1, an engine 1 is arranged in a front section of a vehicle Ve between front wheels 3 (i.e., at about the width center of the vehicle) in such a manner that an output shaft (not shown) extends toward rear wheels 2.

The engine 1 is a straight internal combustion engine to generate mechanical power by burning air/fuel mixture comprising a plurality of cylinders arranged in line. A transmission 4 is disposed on an output side of the engine 1, and the output shaft of the engine 1 is connected to an input shaft (not shown) of the transmission 4. In order to absorb pulsation of an output torque of the engine 1, a damper mechanism 5 is disposed between the engine 1 and the transmission 4.

A first motor (referred to as "MG1" in FIG. 1) 6 is disposed between the damper mechanism 5 and the transmission 4. Thus, torques of the engine 1 and the first motor 6 are transmitted to the front wheels 3 and the rear wheels 2 through the transmission 4. The transmission 4 is adapted to change a ratio of an input speed to an output speed arbitrarily. For example, a geared transmission in which a gear stage is shifted stepwise, and a continuously variable transmission in which a speed ratio is varied continuously may be used as the transmission 4. The transmission 4 is provided with a clutch C1 as a second clutch of the embodiment that is engaged to transmit torque, and that is disengaged to interrupt torque transmission thereby establishing a neutral stage.

The clutch C1 selectively transmits torque or interrupts torque transmission between the wheels and the engine 1 (and the first motor 6). In the embodiment illustrated in FIG. 1, the clutch C1 is arranged in the transmission 4. Specifically, the clutch C1 includes a friction plate 7 connected to a rotary member (not shown) on the side of the engine 1, and a friction plate 8 connected to a rotary member (not shown) on the side of the rear wheels 2. Although not elaborated in FIG. 1, a multi-plate clutch in which a plurality of the friction plates 7 and a plurality of the friction plates 8 are arranged alternately may be adopted as the clutch C1. Instead, the clutch C1 may also be disposed between the first motor 6 and the transmission 4 to serve as a starting clutch. In any of the cases, the engine 1 and the first motor 6 are disconnected from the powertrain of the vehicle Ve by disengaging the clutch C1, and connected to the powertrain by disengaging the clutch C1.

Thus, the engine 1 and the transmission 4 are arranged coaxially, and the first motor 6 is disposed between the engine 1 and the transmission 4. The first motor 6 serves not only as a motor to generate torque when driven by electricity supped thereto, but also as a generator to generate electricity when driven by torque of the engine 1. Thus, the first motor 6 is a motor-generator. For example, a three-phase permanent magnet type synchronous motor, and a three phase induction motor may be adopted as the first motor 6. Accordingly, the first motor 6 serves as an "actuator" and a "second electric motor" of the embodiment. The first motor 6 may be connected to the output shaft of the engine 1 or the input shaft of the transmission 4 not only directly but also indirectly through a transmission device.

A transfer 9 is disposed on an output side of the transmission 4 to distribute output power of the engine 1 or output torque of the transmission 4 to the front wheels 3 and the rear wheels 2. A rear propeller shaft 10 is connected to an output member (not shown) to deliver torque to the rear wheels 2, and a front propeller shaft 11 is connected to an output member (not shown) to deliver torque to the front wheels 3.

For example, a wrapping transmission using a chain or belt, a gear unit and so on may be used as the transfer 9. In addition, a full-time four-wheel drive mechanism including a differential mechanism that allows a differential rotation between the front wheels 3 and the rear wheels 2 and a restriction mechanism that restricts the differential rotation between the front wheels 3 and the rear wheels 2, and a part-time four-wheel drive mechanism that selectively interrupt torque transmission to the front wheels 3 may also be used as the transfer 9.

Specifically, the rear propeller shaft 10 extends from the transmission 4 or the transfer 9 to be connected to a rear differential gear unit 12 as a final reduction to distribute torque to the rear wheels 2. On the other hand, the front propeller shaft 11 also extends from the transfer 9 to be connected to a front differential gear unit 13 as a final reduction to distribute torque to the front wheels 3.

A second motor (referred to as "MG2" in FIG. 1) 14 is disposed on the output side of the transmission 4 and is connected to the powertrain of the vehicle Ve so that torque of the second motor 14 is delivered to the front wheels 3 and the rear wheels 2. Specifically, the second motor 14 as a "first electric motor" of the embodiment is connected to the front propeller shaft 11 through a clutch C2 and a speed reducing mechanism 15 so that the torque of the second motor 14 is delivered to the front wheels 3 and the rear wheels 2 while being multiplied. The clutch C2 is engaged to transmit the torque between the second motor 14 and the front propeller shaft 11, and disengaged to interrupt torque transmission between the second motor 14 and the front propeller shaft 11.

The second motor 14 also serves not only as a motor to generate torque when driven by electricity suppled thereto, but also as a generator to generate electricity when driven by torque applied thereto from an external source. That is, the second motor 14 is also a motor-generator. For example, a three-phase permanent magnet type synchronous motor, and a three-phase induction motor may also be adopted as the second motor 14. Accordingly, the clutch C2 serves as a "selective transmission device" and a "second clutch" of the embodiment. The clutch C2 is engaged in most situation during propulsion. According to the embodiment, therefore, a dog clutch having high durability that can be engaged strongly is adopted as the clutch C2.

Thus, in the vehicle Ve shown in FIG. 1, a drive torque generated by the prime mover is distributed to both of the front wheels 3 and the rear wheels 2. In other words, both of the front wheels 3 and the rear wheels 2 serve as drive wheels. Nonetheless, the control system according to the embodiment of the present disclosure may also be applied to a front-drive layout vehicle in which the drive torque is delivered only to the front wheels, and to a rear-drive layout vehicle in which the drive torque is delivered only to the rear wheels.

Figure 2:
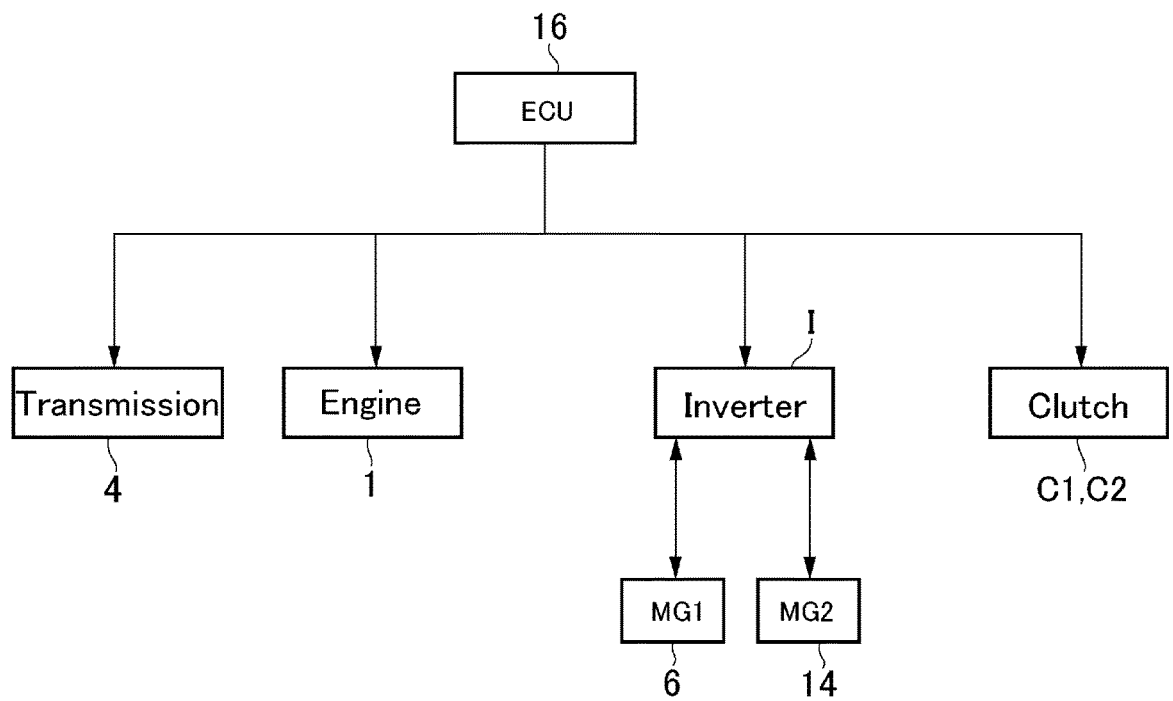
FIG. 2 is a block diagram schematically showing a control system of the vehicle shown in FIG. 1.

Thus, the vehicle Ve according to the embodiment is provided with the engine 1 and two motors 6 and 14 so that an operating mode of the vehicle Ve may be selected from a plurality of modes. The control system of the vehicle Ve is schematically shown in FIG. 2. An ignition timing, an opening degree of a throttle valve etc. of the engine 1, and a driving range such as a forward range and a reverse range, a gear stage etc. of the transmission 4 may be controlled electrically. In addition, the clutches C1 and C2 may be engaged and disengaged electrically. The first motor 6 and the second motor 14 are connected individually to an inverter I to be operated selectively as a motor and a generator.

The engine 1, the transmission 4, the clutches C1 and C2, the inverter I, the first motor 6, and the second motor 14 are connected electrically to an electronic control unit (to be abbreviated as the "ECU" hereinafter) 16 as a controller of the embodiment. The ECU 16 is composed mainly of a microcomputer configured to execute a calculation based on an incident data and data stored in advance, and to transmit a calculation result in the form of command signal. To this end, the ECU 16 receives data about a speed of the vehicle Ve, speeds of the wheels 2 and 3, a position of an accelerator pedal representing a drive demand, a state of charge level (to be abbreviated as the "SOC" hereinafter) of a battery, a speed of the engine 1, an output torque of the engine 1, speeds of the motors 6 and 14, output torques of the motors 6 and 14, a pedal force applied to a brake pedal or a depression of the brake pedal representing a brake demand, and so on. The data stored in advance includes a map determining the operating mode. For example, the ECU 16 transmits command signals for starting and stopping the engine 1, torque command signals for operating the engine 1, the first motor 6, and the second motor 14, torque command signals for manipulating the clutches C1 and C2 and so on. Optionally, a plurality of the ECUs may be arranged in the vehicle Ve to individually control the above mentioned devices.

The operating mode of the vehicle Ve may be selected form a plurality of modes by controlling the engine 1, the first motor 6, the second motor 14, the transmission 4, and the clutches C1 and C2 etc. by the ECU 16. For example, the operating mode of the vehicle Ve may be selected from: (1) an electric vehicle mode (to be abbreviated as the "EV mode" hereinafter) in which a drive force is generated by delivering torque generated by the second motor 14 to the wheels 2 and 3 while stopping the engine 1; (2) a series hybrid vehicle mode in which the engine 1 is operated while disengaging the clutch C1 and engaging the clutch C2, the first motor 6 is operated as a generator by a torque of the engine 1 to generate electricity, and a drive force is generated by delivering torque generated by the second motor 14 to the wheels 2 and 3; and (3) a parallel hybrid vehicle mode in which the engine 1 is operated while engaging the clutches C1 and C2, and a drive force is generated by delivering torques of the engine 1 and the second motor 14 to the wheels 2 and 3. Specifically, the operating mode of the vehicle Ve is selected with reference to a map for selecting the operating mode based on a required drive force and a vehicle speed. In addition, a drive mode of the vehicle Ve may also be selected from a four-wheel drive mode and a two-wheel drive mode in accordance with a switching operation of a driver.

When the vehicle Ve is stopped on an upslope while manipulating the accelerator pedal, the vehicle Ve may be moved backwardly by gravity. In order to keep the vehicle Ve stopping, for example, a reaction force against the backward movement of the vehicle Ve may be established by the first motor 6 or the second motor 14. In this case, electric current is supplied to the motor 6 or 14 but the output shaft (or a rotor shaft) of the motor is not rotated. That is, the electric current is supplied only to a specific phase or a switching element of the motor. If the motor 6 or 14 generates the reaction force continuously for a long period of time, a thermal load on the specific phase will be increased to cause an overheating of the motor. Normally, in the vehicle Ve shown in FIG. 1, the second motor 14 generates such reaction force to keep the vehicle Ve stopping on the slope. However, if a thermal load e.g., on the second motor 14 is increased greater than a predetermined value within a predetermined period of time, the second motor 14 and the inverter I controlling the second motor 14 as well as an electric circuit may be thermally damaged and performances of the second motor 14 and the inverter I may be reduced. The predetermined value of the thermal load is set to a maximum allowable value of the thermal load on each of the phases and the switching elements by which the electric circuit is not damaged, or to a value slightly smaller than the maximum value taking account of a response delay and a safety margin.

Figure 3:
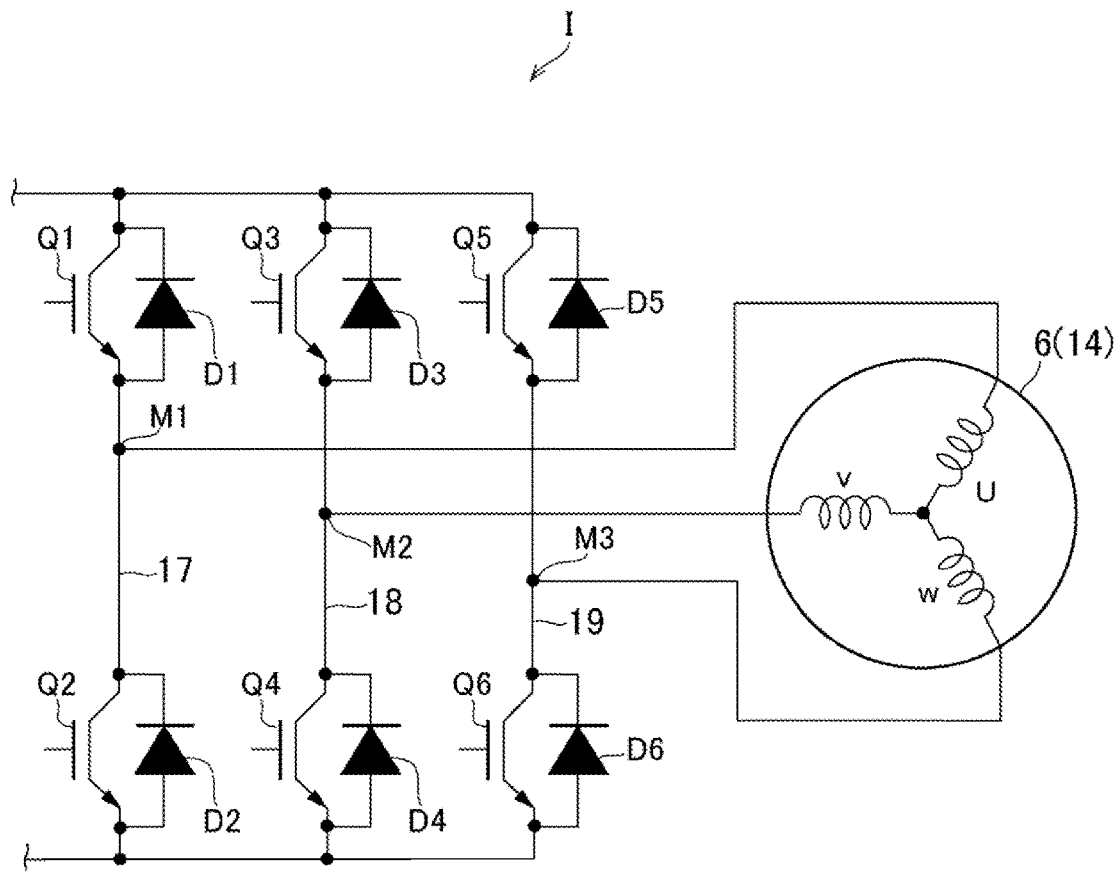
FIG. 3 is a schematic illustration showing a structure of an inverter.

A structure of the inverter I and the electric circuit for supplying electricity to the first motor 6 or the second motor 14 is partially shown in FIG. 3. As shown in FIG. 3, the inverter I comprises three circuits formed parallel to one another between a positive line and a negative line. The inverter I is configured to convert a direct current supplied from the battery into an alternate current, and to convert an alternate current generated by the first motor 6 or the second motor 14 into a direct current. Specifically, the inverter I comprises an arm 17 connected to a U-phase of the motor 6 or 14, an arm 18 connected to an V-phase of the motor 6 or 14, and an arm 19 connected to an W-phase of the motor 6 or 14. The arm 17 connects a switching element Q1 directly to a switching element Q2, the arm 18 connects a switching element Q3 directly to a switching element Q4, and the arm 19 connects a switching element Q5 directly to a switching element Q6. In order to allow the electric current to flow between a collector and an emitter of each of the switching elements Q1 to Q6, diodes D1 to D6 are connected individually to the collector and the emitter of each of the switching elements Q1 to Q6. According to the embodiment, for example, an IGBT (i.e., Insulated Gate Bipolar Transistor) may be adopted respectively as the switching elements Q1 to Q6.

The switching elements Q1 to Q6 are turned on and turned off in response to command signals transmitted from the ECU 16. As shown in FIG. 3, the switching elements Q1, Q3, and Q5 are connected to a high-voltage side (i.e., plus terminal side) of the battery thereby forming an upper arm (or a high-voltage arm). On the other hand, the switching elements Q2, Q4, and Q6 are connected to a low-voltage side (i.e., minus terminal side) of the battery thereby forming a lower arm (or a low-voltage arm).

In the first motor 6 or the second motor 14, one of end portions of coils of the U-phase, the V-phase, and the W-phase are connected to one another at a midpoint. The other end portion of the coil of the U-phase is connected to a midpoint M1 between the switching elements Q1 and Q2, the other end portion of the coil of the V-phase is connected to a midpoint M2 between the switching elements Q3 and Q4, and the other end portion of the coil of the W-phase is connected to a midpoint M3 between the switching elements Q5 and Q6. The first motor 6 and the second motor 14 are individually provided with a position sensor for detecting a rotational angle of a rotor, and a detection value of the rotational angle of the rotor is sent to the ECU 16.

Figure 4:
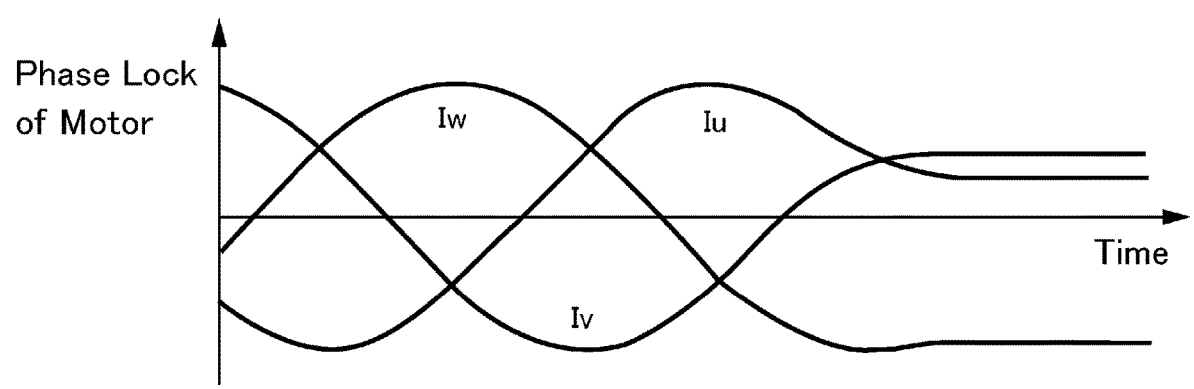
FIG. 4 is a graph explaining a principle of phase lock of the motor.

A principle of phase lock of the motor is shown in FIG. 4. The ECU 16 manipulates the switching elements Q1 to Q6 in such a manner that phases of sine waves individually representing the current supplied to a coil of each phase in the inverter I are equally shifted 120 degrees apart. Those sine waves of the phase currents are maintained in the normal condition. However, if one of the phases of the motor or the inverter I is thermally damaged, the sine wave representing the damaged phase cannot be maintained as indicated in the right section of FIG. 4.

The thermal damage on the motor or the inverter resulting from the phase lock may be reduced by reducing an output of the motor. However, if the output torque of the motor is reduced while stopping the vehicle on an upslope by an output torque of the motor, the vehicle may be gravitated backwardly. In order to limit such thermal damage on the motor or the inverter resulting from the phase lock while stopping the vehicle, the control system according to the embodiment executes the routines to be described below.

Figure 5:
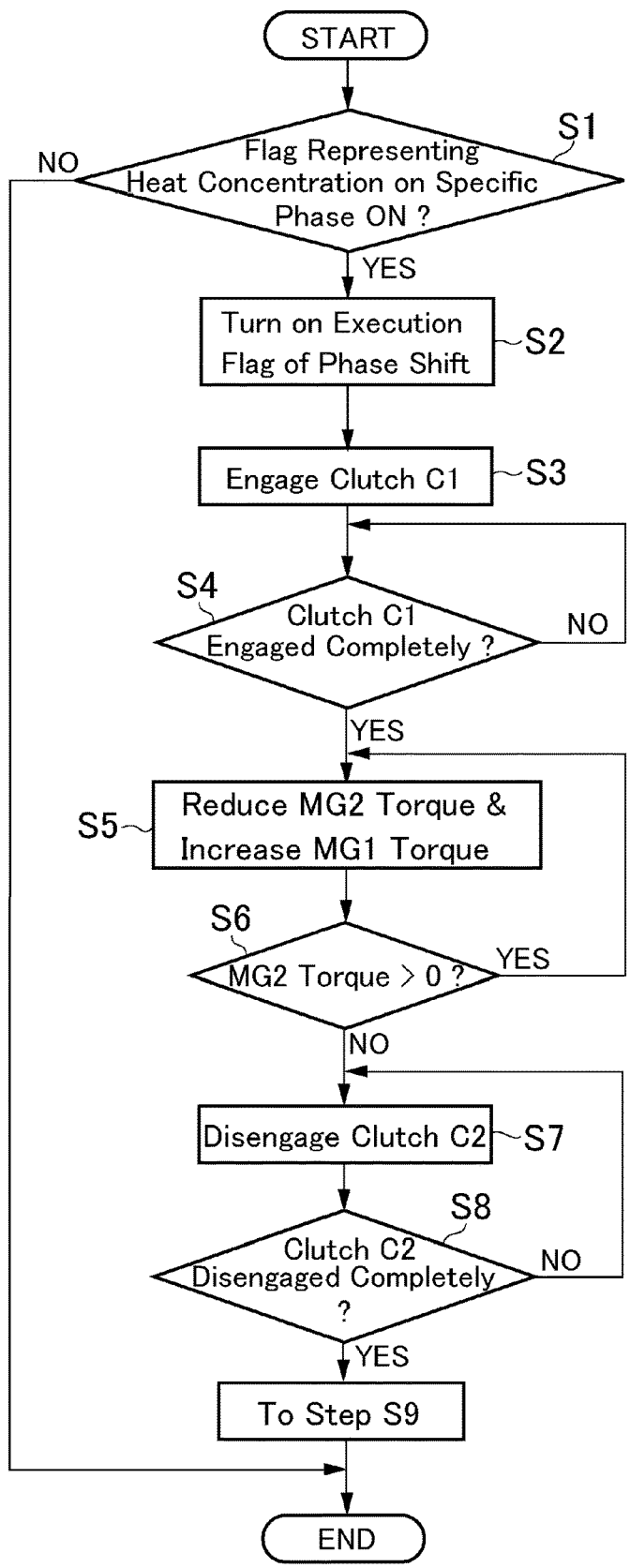
FIG. 5 is a flowchart showing a routine for preventing an overheating of the motor.

For example, the routines shown in FIGS. 5 to 8 are executed when stopping the vehicle Ve on an upslope by manipulating the accelerator pedal to stop the vehicle Ve by output torque of the motor. The routine shown in FIG. 5 is configured such that the second motor 14 is used to generate torque to stop the vehicle Ve.

Figure 6:
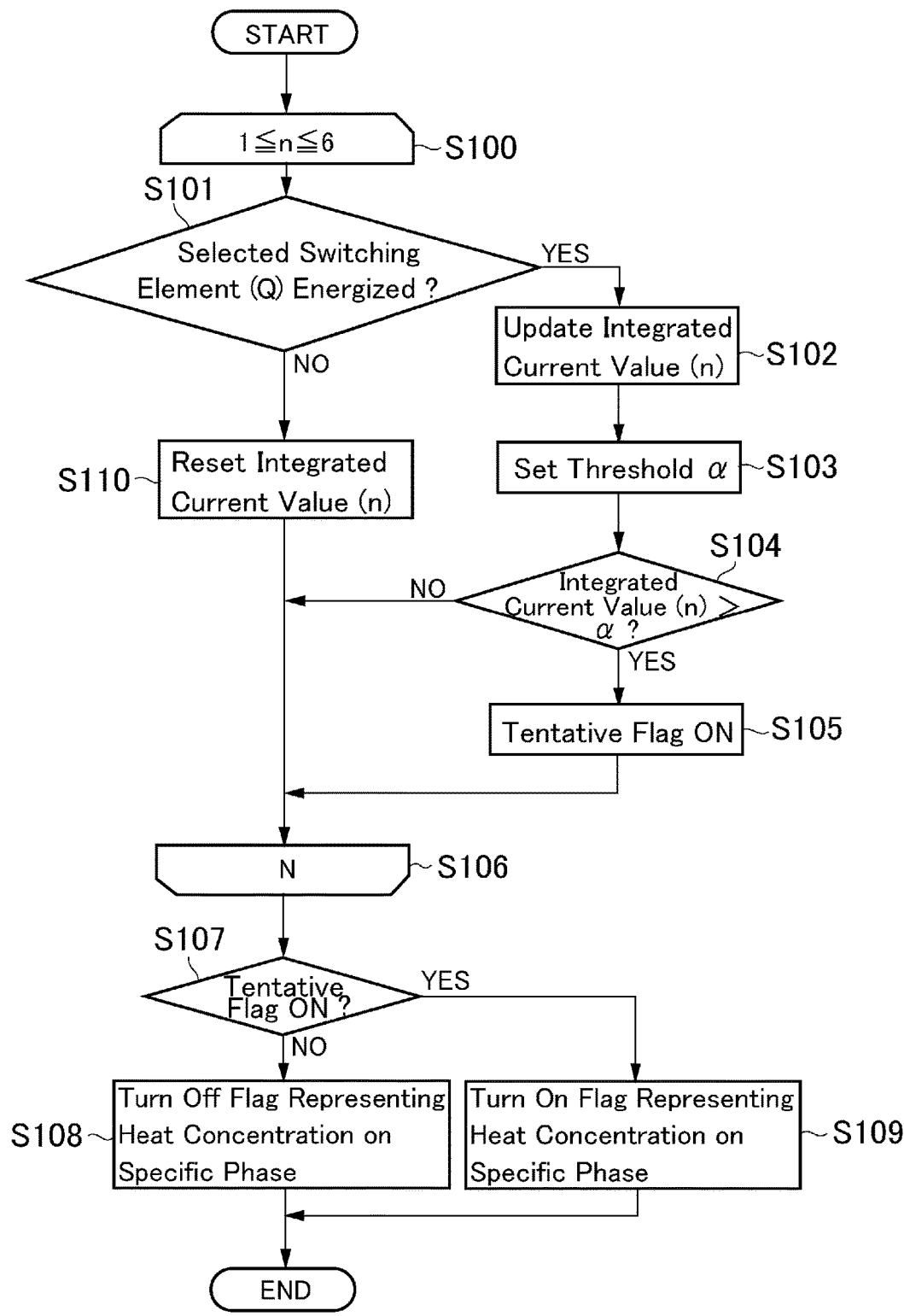
FIG. 6 is a flowchart showing a routine for determining a possibility of thermal damage to the motor.
Figure 7:
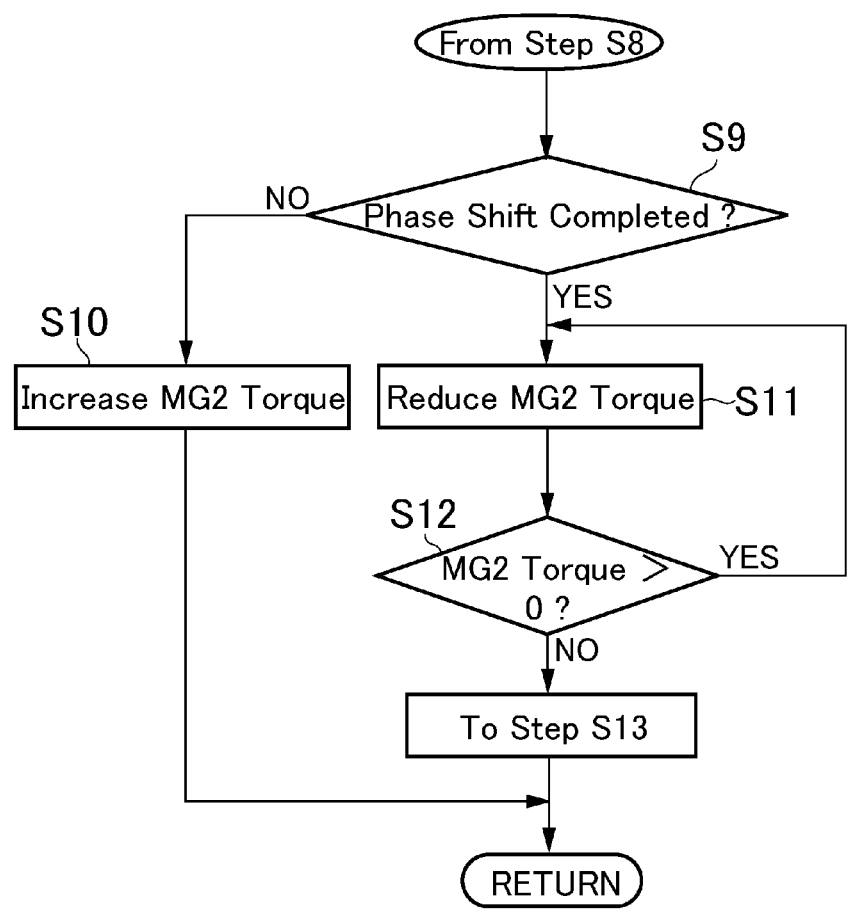
FIG. 7 is a flowchart showing a routine for executing a phase shift control.
Figure 8:
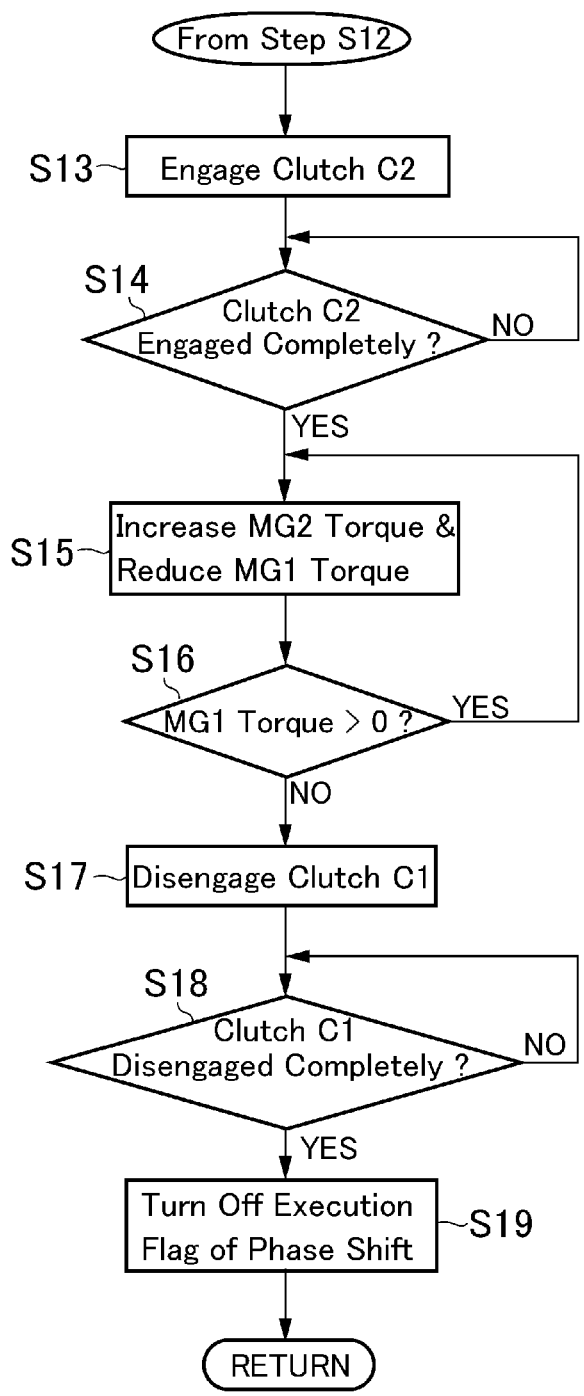
FIG. 8 is a flowchart showing a routine for propelling the vehicle in an electric vehicle mode.

Specifically, the routine shown in FIG. 5 is executed to prevent thermal damage to the second motor 14 and the inverter I resulting from the phase lock of the second motor 14, the routine shown in FIG. 6 is executed to determine a possibility of thermal damage to the second motor 14 and the inverter I, the routine shown in FIG. 7 is executed to prevent a reduction in the output torque of the second motor 14 by shifting the energizing phase of the second motor 14, and the routine shown in FIG. 8 is executed to propel the vehicle Ve by the second motor 14 in the EV mode after shifting the energizing phase.

First of all, at step S1 of the routine shown in FIG. 5, it is determined whether a thermal load is concentrated on the specific phase (U-phase, V-phase, W-phase) or the specific switching element (Q1 to Q6). Specifically, such determination at step S1 may be made based on an integrated current value by executing the subroutine shown in FIG. 6.

At step S100 of the routine shown in FIG. 6, the snitching element to be determined whether the thermal load is concentrated thereon is selected. According to the embodiment, a three-phase AC motor is used as the second motor 14, and each of the U-phase, the V-phase, and the W-phase comprises a pair of the switching elements. That is, the inverter I comprises six switching elements Q1 to Q6 in total. Accordingly, one of the switching elements in each phase corresponds to the "first switching element (Q1, Q3, Q5)" of the embodiment, and other one of the switching elements in each phase corresponds to the "second switching element (Q2, Q4, Q6)" of the embodiment. In the routine shown in FIG. 6, "n" represents the selected switching element Q.

Then, it is determined at step S101 whether the current is supplied to the selected switching element Q.

If the current is supplied to the selected switching element Q so that the answer of step S101 is YES, the routine progresses to step S102 to update the integrated current value of the switching element Q being energized. Then, at step S103, a threshold value α for determining an occurrence of the phase lock in the second motor 14 based on a rotational angle of the second motor 14 is calculated. Specifically, the threshold value α may be calculated with reference to a map shown in FIG. 9.

Figure 9:
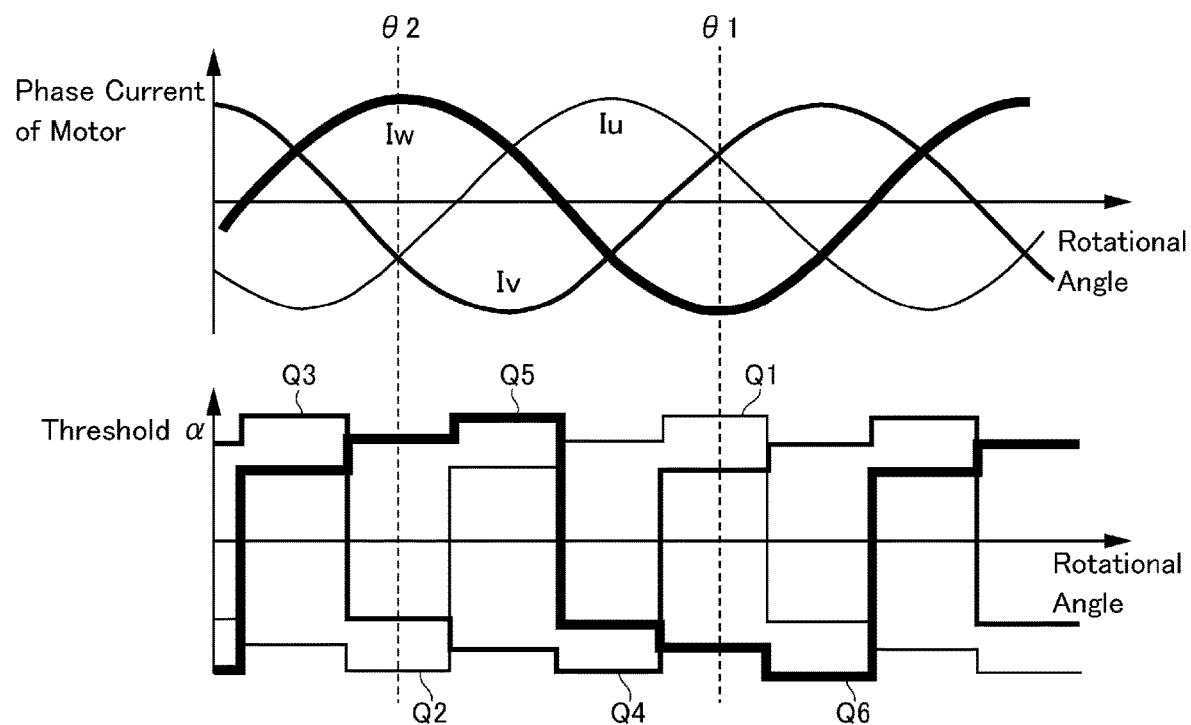
FIG. 9 is a map for setting a threshold value for determining a possibility of thermal damage to the motor resulting from phase lock.

The threshold value α is a criterion value of the thermal load (i.e., amount of heat) at which the second motor 14 or the inverter I is thermally damaged, and the threshold value α is estimated based on the integrated current value of the switching element Q. As described, the switching elements Q1 to Q6 are manipulated in such a manner that the phases of the sine waves individually representing the current supplied to the coil of each phase in the inverter I are equally shifted 120 degrees apart. In FIG. 9, the vertical axes represent the phase current and the threshold value α, and the horizontal axes represent the rotational angle of the second motor 14. As can be seen from FIG. 9, the threshold value α for each of the switching elements Q1 to Q6 are varied depending on the rotational angle of the second motor 14. For example, at angle θ1, the current value supplied to the switching element Q1 will be reduced to zero in short time, that is, by slightly increasing the rotational angle. Therefore, the threshold value α for the switching element Q1 is set to a relatively higher level. On the other hand, at angle θ1, the current value supplied to the switching element Q3 is being increased to the peak value, and the current value supplied to the switching element Q6 is increased to the peak value. In this situation, therefore, it will take longer time to reduce the current values supplied to the switching elements Q3 and Q6 to zero in comparison with the case of reducing the current value supplied to the switching element Q1 to zero. In other words, it is necessary to increase the rotational angle greater than that required to reduce the current value supplied to the switching element Q1 to zero. Therefore, the threshold values a for the switching elements Q3 and Q6 are respectively set to a lower level than the threshold value α for the switching element Q1. That is, if it is necessary to increase the rotational angle of the second motor 14 significantly to reduce the current value supplied to the switching element Q to zero, the threshold value α is set to a low level, and if the current value supplied to the switching element Q is reduced to zero by slightly increasing the rotational angle of the second motor 14, the threshold value α is set to a high level. In other words, if it takes long time to reduce the current value supplied to the switching element Q to zero, the threshold value α is set to a low level, and if the current value supplied to the switching element Q is reduced to zero in short time, the threshold value α is set to a high level. Here, it is to be noted that one cycle of the sine wave shown in FIG. 9 corresponds to an angle obtained by dividing a full-revolution angle (i.e., 360 degrees) of the second motor 14 by a number of poles of the second motor 14. For example, if the second motor 14 has six poles, the second motor 14 rotates 60 degrees at one cycle.

The rotational angle of the second motor 14 and the current value supplied to the second motor 14 may be measured by sensors. Therefore, the threshold value α for determining a possibility of thermal damage to the second motor 14 and the inverter I is set on the basis of the rotational angle of the second motor 14 and the current value supplied to the second motor 14 measured by the sensor, with reference to the map shown in FIG. 9. Here, steps S102 and S103 may be executed simultaneously, or step S103 may be executed prior to step S102.

Then, it is determined at step S104 whether the integrated current value of the switching element Q updated at step S102 is greater than the threshold value α set at step S103. In other words, a possibility of thermal damage to the second motor 14 and the inverter I is determined. If the integrated current value of the switching element Q is greater than the threshold value α so that the answer of step S104 is YES, the routine progresses to step S105 to turn on a tentative flag representing the possibility of thermal damage to the second motor 14 and the inverter I. According to the embodiment, a possibility of thermal damage to the second motor 14 and the inverter I is determined for each of the switching elements Q1 to Q6. Therefore, if the switching element which might be damaged thermally is found, the tentative flag is turned on to indicate a possibility of thermal damage to the second motor 14 and the inverter I. After thus determining the concentration of the thermal load on one of the switching elements, steps S100 to S105 are repeated to determine the concentration of the thermal load on the remaining switching elements.

After determining the concentration of the thermal load on all of the switching elements, the routine progresses to step S106 to identify the switching element on which the thermal load is concentrated. Then, at step S107, it is determined whether the tentative flag representing the concentration of the thermal load on any of the switching element(s) has been turned on. Here, the identification of the switching element on which the thermal load is concentrated at step S106 may be skipped if it is possible to identify the switching element(s) on which the thermal load is concentrated only by confirming the tentative flags.

If the thermal load is concentrated on none of the switching elements so that the answer of step S107 is NO, the routine progresses to step S108 to turn off a flag representing the concentration of the thermal load on the specific phase. Otherwise, if the thermal load is concentrated on at least any one of the switching elements so that the answer of step S107 is YES, the routine progresses to step S109 to turn on the flag representing the concentration of the thermal load on the specific phase.

By contrast, if the current is not supplied to the selected switching element Q so that the answer of step S101 is NO, the routine progresses to step S110 to reset the selected integrated current value of the switching element Q. For example, the answer of step S101 will be YES in a case that the switching element Q1 is selected, and that the rotational angle of the second motor is θ2 shown in FIG. 9 and hence the current value supplied to the switching element Q1 is zero. Then, the routine progresses to steps S106 and S107 sequentially, and if none of the tentative flag has been turned on so that the answer of step S107 is NO, the routine progresses to step S108 to turn off the flag representing the concentration of the thermal load on the specific phase. Otherwise, if the tentative flag representing at least any one of the switching elements has been turned on so that the answer of step S107 is YES, the routine progresses to step S109 to turn on the flag representing the concentration of the thermal load on the specific phase.

Likewise, if the integrated current value of the switching element Q being energized is still smaller than the threshold value α so that the answer of step S104 is NO, the routine also progresses to steps S106 to S109.

Turning back to FIG. 5, if the flag representing the concentration of the thermal load on the specific phase is turned off so that the answer of step S1 is NO, the routine returns without carrying out any specific control.

By contrast, if the flag representing the concentration of the thermal load on the specific phase is turned on so that the answer of step S1 is YES, the routine progresses to step S2 to turn on an execution flag of a phase shift control to shift the phase to which the current is supplied. As described, if the current is continuously supplied to the specific phase of the second motor 14, the specific phase as well as the switching elements of the specific phase may be thermally damaged, and consequently the output torque of the second motor 14 for stopping the vehicle Ve on the upslope may be reduced. In order to prevent such reduction in the output torque of the second motor 14, the phase to which the current is supplied is shifted.

If the output torque of the second motor 14 for stopping the vehicle Ve on the upslope is reduced, the vehicle Ve may be gravitated backwardly. In order to prevent such backward movement of the vehicle Ve, at step S3, a command to engage the clutch C1 is transmitted to deliver an output torque of the first motor 6 to the drive wheels.

Then, it is determined at step S4 whether the clutch C1 has been engaged completely. If the clutch C1 has not yet been engaged completely so that the answer of step S4 is NO, the determination at step S4 is repeated until the clutch C1 is engaged completely while increasing a torque capacity of the clutch C1. By contrast, if the clutch C1 has been engaged completely so that the answer of step S4 is YES, the routine progresses to step S5 to gradually reduce the output torque of the second motor 14, and to gradually increase the output torque of the first motor 6.

When the clutch C1 is engaged completely, the first motor 6 generates the output torque as a reaction force to stop the vehicle Ve on the upslope. At the same time, the output torque of the second motor 14 is reduced to zero so as to reduce the thermal load accumulated on the specific phase being energized. As a result, the vehicle Ve can be prevented from being gravitated on the upslope while limiting thermal damage on the second motor 14. Specifically, the output torque of the second motor 14 is reduced gradually so as to reduce a shock.

In this situation, since the clutch C1 is in engagement, the engine 1 is also connected to the drive wheels. That is, a friction torque of the engine 1 derived from an inertia and a pumping loss may serve as a part of the reaction force to stop the vehicle Ve on the upslope. That is, an increasing amount of the output torque of the first motor 6 may be reduced smaller than a reducing amount of the output torque of the second motor 14, in an amount of the reaction force established by the friction torque of the engine 1. Here, magnitude of the friction torque of the engine 1 is governed by a crank angle (or position of pistons) and an oil temperature of the stopping engine 1. For example, if the oil temperature of the engine 1 is low, the friction torque of the engine 1 is increased. By contrast, if the oil temperature of the engine 1 is high, the friction torque of the engine 1 is reduced.

Then, it is determined at step S6 whether the output torque of the second motor 14 is reduced to zero, in other words, the output torque of the second motor 14 is still greater than zero. Such determination at step S6 is executed to carry out the below-mentioned phase shift control, and the second motor 14 can be cooled by interrupting current supply to the second motor 14. If the output torque of the second motor 14 has not yet been reduced to zero, in other words, if the output torque of the second motor 14 is still greater than zero so that the answer of step S6 is YES, the routine returns to step S5 to further reduce the output torque of the second motor 14 while gradually increasing the output torque of the first motor 6. By contrast, if the output torque of the second motor 14 has been reduced to zero so that the answer of step S6 is NO, the routine progresses to step S7 to transmit a command to disengage the clutch C2.

Thereafter, it is determined at step S8 whether the clutch C2 is disengaged completely. If the clutch C2 has not yet been disengaged completely so that the answer of step S8 is NO, such determination at step S8 is repeated until the clutch C2 is disengaged completely. By contrast, if the clutch C2 has been disengaged completely so that the answer of step S8 is YES, the routine progresses to step S9 of the subroutine for executing the phase shift control of the second motor 14 shown in FIG. 7.

At step S9, it is determined whether the phase (or the switching element Q) of the second motor 14 on which the thermal load is concentrated and which was identified by the subroutine shown in FIG. 6 has been shifted to another phase. If the energizing phase of the second motor 14 has not yet been shifted to another phase so that the answer of step S9 is NO, the routine progresses to step S10 to gradually increase the output torque of the second motor 14 thereby changing a rotational angle of the second motor 14. Consequently, the energizing phase of the second motor 14 is shifted to another phase. For example, in a case that the integrated current value of the switching element Q1 reaches the threshold value α shown in FIG. 9, the rotational angle of the second motor 14 is changed in such a manner that the energizing element from the switching element Q1 to another the switching element. To this end, the rotational angle of the second motor 14 may be adjusted not only in the forward direction but also in a reverse direction. In order to change the energizing phase, specifically, the torque of the second motor 14 is increased to a magnitude slightly greater than a cogging torque.

By contrast, if the energizing phase of the second motor 14 has been shifted to another phase, the answer of step S9 will be YES. In this case, the output torque of the second motor 14 has been increased at step S10 of the previous routine. Therefore, in order engage the disengaged clutch C2 again, the routine progresses to step S11 to gradually reduce the output torque of the second motor 14 to zero. As described, the output torque of the second motor 14 was increased at step S10 only slightly to shift the energizing phase, the output torque of the second motor 14 is reduced without requiring a negative torque to stop a rotation thereof.

Then, it is determined at step S12 whether the output torque of the second motor 14 is reduced to zero, in other words, the output torque of the second motor 14 is still greater than zero. If the output torque of the second motor 14 has not yet been reduced to zero, in other words, if the output torque of the second motor 14 is still greater than zero so that the answer of step S12 is YES, the output torque of the second motor 14 is further reduced to zero. By contrast, if the output torque of the second motor 14 has been reduced to zero so that the answer of step S12 is NO, the routine progresses to step S13 of the routine shown in FIG. 8 to propel the vehicle Ve in the EV mode.

In this situation, the vehicle Ve is still stopped on the upslope by manipulating the accelerator pedal to establish the reaction force by the first motor 6. However, it is preferable to launch the vehicle Ve by the second motor 14 in the EV mode. To this end, the clutch C2 will be engaged again and the second motor 14 will generate the torque.

Specifically, at step S13, a command to engage the clutch C2 is transmitted at step S13. Then, it is determined at step S14 whether the clutch C2 is engaged completely. If the clutch C2 has not yet been engaged completely so that the answer of step S14 is NO, such determination at step S14 is repeated until the clutch C2 is engaged completely. By contrast, if the clutch C2 is engaged completely so that the answer of step S14 is YES, the routine progresses to step S15 to generate the reaction force to stop the vehicle on the upslope by the second motor 14 instead of the first motor 6. At step S15, specifically, the output torque of the second motor 14 is gradually increased and the output torque of the first motor 6 is gradually reduced to zero. As described, the increasing amount of the output torque of the first motor 6 at step S5 is smaller than the reducing amount of the output torque of the second motor 14 at step S5. At step S15, accordingly, an increasing amount of the output torque of the second motor 14 is greater than a reducing amount of the output torque of the first motor 6.

Then, it is determined at step S16 whether the output torque of the first motor 6 is reduced to zero, in other words, the output torque of the first motor 6 is still greater than zero. If the output torque of the first motor 6 has not yet been reduced to zero so that the answer of step S16 is YES, the routine returns to step S15. By contrast, if the output torque of the first motor 6 has been reduced to zero so that the answer of step S16 is NO, the routine progresses to step S17 to transmit a command to disengage the clutch C1. Then, it is determined at step S18 whether the clutch C1 is disengaged completely. If the clutch C1 has not yet been disengaged completely so that the answer of step S18 is NO, such determination at step S18 is repeated until the clutch C1 is disengaged completely. By contrast, if the clutch C1 has been disengaged completely so that the answer of step S18 is YES, the routine progresses to step S19 to turn off the execution flag of the phase shift control. Consequently, the phase shift control is terminated.

Figure 10:
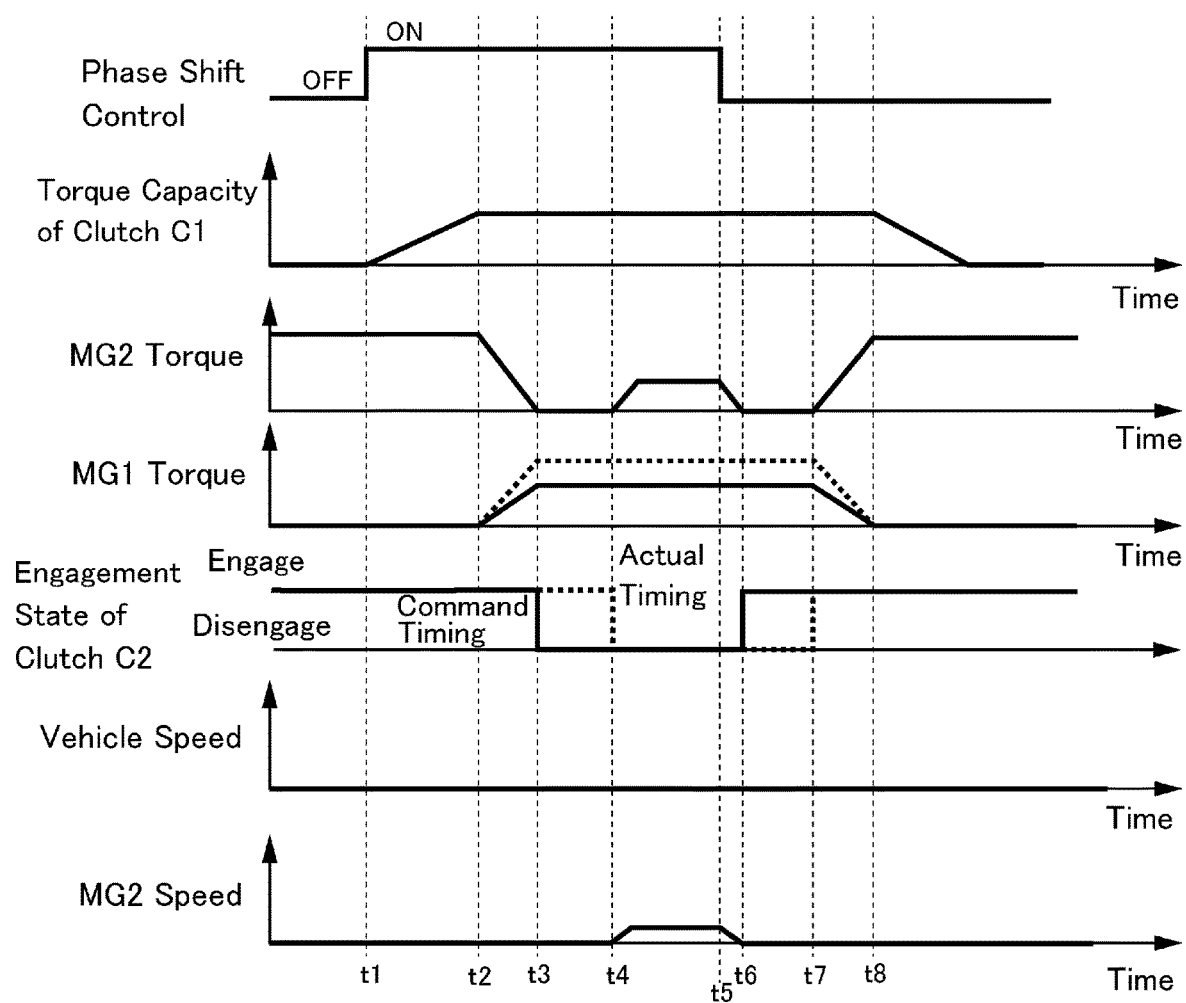
FIG. 10 is a time chart showing temporal changes in an execution flag of phase shift, a torque capacity of a clutch C1, a torque of a first motor, a torque of a second motor, an engagement state of a clutch C2, a vehicle speed, and a speed of the second motor during execution of the routines shown in FIGS. 5 to 8.

FIG. 10 shows a situation during execution of the routines shown in FIGS. 5 to 8 in the vehicle Ve stopped on an upslope by establishing the reaction force by second motor 14 and a thermal load is concentrated on a specific phase of the second motor 14. Specifically, temporal changes in the execution flag of the phase shift control, a torque capacity of the clutch C1, an output torque of the second motor 14, an output torque of the first motor 6, an engagement state of the clutch C2, a vehicle speed, and a speed of the second motor 14 in the above mentioned situation are shown in FIG. 10.

At point t1, the phase or the switching element of the second motor 14 on which the thermal load is concentrated is identified, and hence the execution flag of the phase shift control is turned on. At the same time, engagement of the clutch C1 is commenced to generate the reaction force to stop the vehicle Ve on the upslope by the first motor 6 instead of the second motor 14. Consequently, the torque capacity of the clutch C1 starts increasing.

Eventually, the torque capacity of the clutch C1 reaches a maximum value at point t2. That is, the clutch C1 is engaged completely. At the same time, the output torque of the second motor 14 is reduced gradually, and the output torque of the first motor 6 is increased gradually. As described, since the clutch C1 is in engagement, the friction torque of the engine 1 may serve as a part of the reaction force to stop the vehicle Ve. In this situation, therefore, the increasing amount of the output torque of the first motor 6 is smaller than the reducing amount of the output torque of the second motor 14 as indicated by the solid line in FIG. 10. In this situation, however, if a throttle valve of the engine 1 is opened, the output torque of the first motor 6 is increased to the level indicated by the dashed-line in FIG. 10. If it is sufficient to stop the vehicle Ve by increasing the output torque of the first motor 6 to the level indicated by the solid line, electric power consumption can be reduced.

When the output torque is reduced to zero at point t3, the command to disengage the clutch C2 is transmitted. The clutch C2 is disengaged completely at point t4, and the output torque of the second motor 14 is increased from point t4 to shift the energizing phase. As described, specifically, the torque of the second motor 14 is increased only slightly to shift the energizing phase. Consequently, a speed of the second motor 14 is slightly increased.

As a result of thus driving the second motor 14, the energizing phase (or the switching element to be energized) is shifted to another phase, and the execution flag of the phase shift control is turned off at point t5. At the same time, the output torque of the second motor 14 is reduced toward zero. Eventually, both of the output torque and the speed of the second motor 14 are reduced to zero at point t6, and the command to engage the clutch C2 is transmitted.

When the clutch C2 is engaged completely, the output torque of the first motor 6 is reduced and the output torque of the second motor 14 is increased at point t7. Consequently, the reaction force to stop the vehicle on the upslope can be generated by the second motor 14, and the vehicle Ve can be launched by the second motor 14.

Thereafter, when the output torque of the first motor 6 is reduced to zero at point t8, the torque capacity of the clutch C1 is reduced to zero. Consequently, the clutch C1 is disengaged. Note that the vehicle Ve is stopped on the slope in the situation shown in FIG. 10, therefore, the vehicle speed is not changed throughout the situation shown in FIG. 10. Similarly, although speed of the second motor 14 is increased temporarily from point t4 to point t5 to shift the energizing phase, speed of the second motor 14 is zero in the remaining period of time.

Thus, according to the embodiment of the present disclosure, if the thermal load is concentrated on the specific phase in the second motor 14, the energizing phase is shifted to another phase. According to the embodiment of the present disclosure, therefore, thermal damage to the second motor 14 and the inverter I may be limited. In addition, when shifting the energizing phase, the clutch C1 is engaged and the clutch C2 is disengaged to establish the reaction force to stop the vehicle Ve on a slope by the first motor 6 instead of the second motor 14. For this reason, the vehicle Ve can be stopped on the slope by the torque of the first motor 6 while preventing the second motor 14 from being damaged by heat.

Moreover, in order to shift the energizing phase, the clutch C1 is merely engaged and the clutch C2 is merely disengaged. That is, engagement states of the clutch C1 and the clutch C2 are changed without causing a slip. On the other hand, according to the teachings of the above-mentioned Japanese patent No. 3964446, the fastening force of the clutch is reduced (to be engaged partially) to maintain the reaction force against the backward movement of the vehicle when shifting the energizing phase. Thus, according to the embodiment of the present disclosure, backward movement of the vehicle can be prevented by the simple control in comparison with the conventional arts.

Further, during shifting the energizing phase of the second motor 14, the first motor 6 generates the reaction torque and the torque of the second motor 14 is reduced to zero. According to the embodiment of the present disclosure, therefore, the second motor 14 can be cooled during shifting the energizing phase.

Furthermore, when stopping the vehicle Ve on the slope by the output torque of the first motor 6 or the second motor 14, the vehicle Ve can be launched by merely depressing the accelerator pedal. In other words, acceleration response can be improved.

Figure 11:
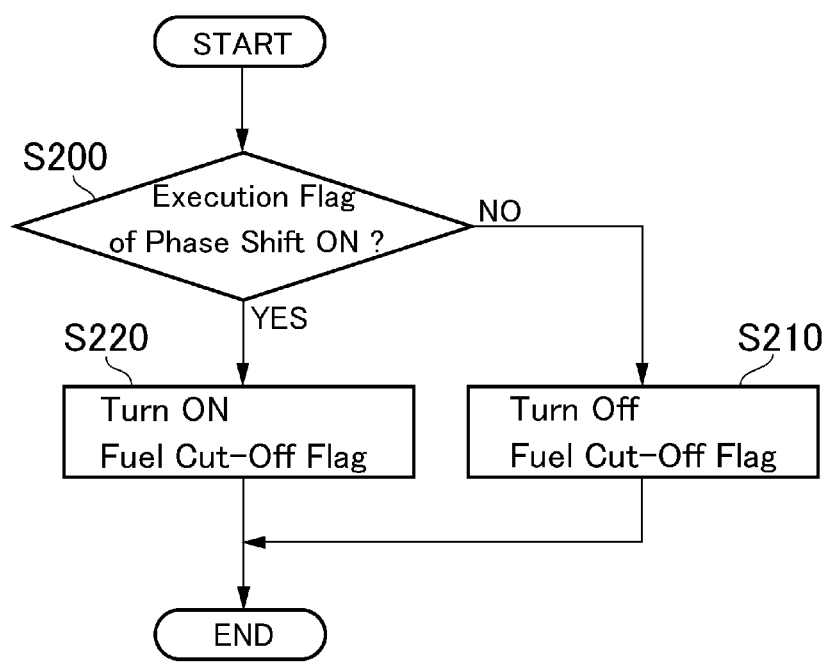
FIG. 11 is a flowchart showing an another example of a routine executed by the vehicle control system according to the embodiment of the present disclosure.

Here will be explained another embodiment of the present disclosure. The driver may further depress the accelerator pedal to launch the vehicle Ve during shifting the energizing phase of the motor or during the period in which the execution flag of the phase shift control is turned on. In this case, the first motor 6 generates torque but the engine 1 may also be started (or combusted) while generating vibrations. In order to avoid such disadvantage, the routine shown in FIG. 11 is configured such that the engine 1 is prevented from being started by stopping fuel supply to the engine 1. In other words, the routine shown in FIG. 11 is configured to execute a fuel cut-off control. In the routine shown in FIG. 11, definition of "start" of the engine 1 is an ignition of the engine 1 and a fuel supply to the engine 1, and a passive rotation of the engine 1 caused by engaging the clutch C1 is not included in the definition of "start" of the engine 1.

At step S200, it is determined whether the execution flag of the phase shift control explained with reference to FIGS. 5 to 8 and 10 is turned on. If the execution flag of the phase shift control is turned off, that is, if the phase shift control is not executed so that the answer of step S200 is NO, the routine progresses to step S210 to turn off a fuel cut-off flag. That is, the fuel cut-off control is not executed in this case. By contrast, if the execution flag of the phase shift control is turned on, that is, if the phase shift control is not executed so that the answer of step S200 is YES, the routine progresses to step S220 to turn on the fuel cut-off flag. That is, the fuel-cut-off control is executed during a period from the point at which the clutch C2 is engaged again to the point at which the clutch C1 is disengaged. Consequently, fuel supply to the engine 1 is stopped during execution of the phase shift control. Therefore, the engine 1 will not be started during execution of the phase shift control to prevent generation of vibration. In addition, the fuel can be saved and emission of exhaust gas can be prevented.

When launching the vehicle Ve during execution of the phase shift control, the output torque of the first motor 6 is increased. However, if a larger drive force is required to launch the vehicle Ve, the clutch C1 is disengaged and the engine 1 is started after the termination of the phase shift control, that is, after engaging the clutch C2 again. In this situation, the engine 1 is rotated by the torque of the first motor 6, therefore, the first motor 6 is required to generate the larger torque taking account of oil temperature etc.

Figure 12:
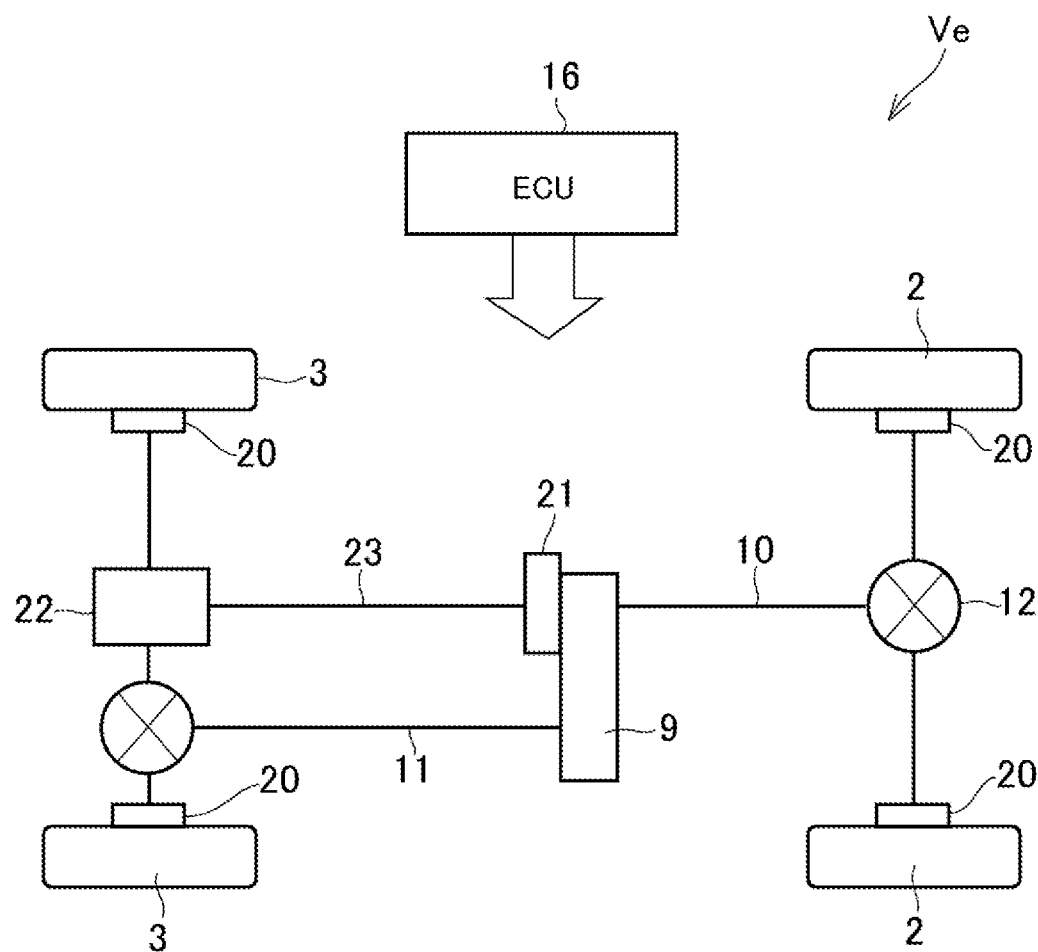
FIG. 12 is a schematic illustration showing another example of a powertrain of the vehicle to which the control system according to the embodiment of the present disclosure is applied.

Next, another example of the vehicle to which the control system according to the embodiment is applied will be explained with reference to FIG. 12. The vehicle Ve shown in FIG. 12 comprises a motor 22 that serves as a prime mover, and an electrically controlled brake system (to be abbreviated as the "EBC" hereinafter) 20 that serves as an actuator for establishing a reaction force against backward movement of the vehicle Ve. In addition, the vehicle Ve further comprises a shifting mechanism 21 that shifts a gear stage among a high gear stage, a low gear stage, and a neutral stage. In the vehicle Ve, an output torque of the motor 22 is delivered to the rear wheels 2 through a driveshaft 23 and the shifting mechanism 21, and to the front wheels 3 through the transfer 9. Accordingly, the shifting mechanism 21 serves as the "selective transmission device" of the vehicle Ve shown in FIG. 12. The remaining structure of the vehicle Ve shown in FIG. 12 is similar to that of the vehicle Ve shown in FIG. 1. In the vehicle shown in FIG. 12, the motor 22 serves as the first electric motor of the embodiment.

When the vehicle Ve shown in FIG. 12 is stopped on an upslope by manipulating the accelerator pedal, a backward movement of the vehicle Ve may also be prevented while limiting a thermal damage to the motor 22 as might be caused by a phase lock, by executing the foregoing routines shown in FIGS. 5 to 8. In this situation, in the vehicle Ve shown in FIG. 12, the ECB 20 generates a reaction force to stop the vehicle Ve on the slope.

Figure 13:
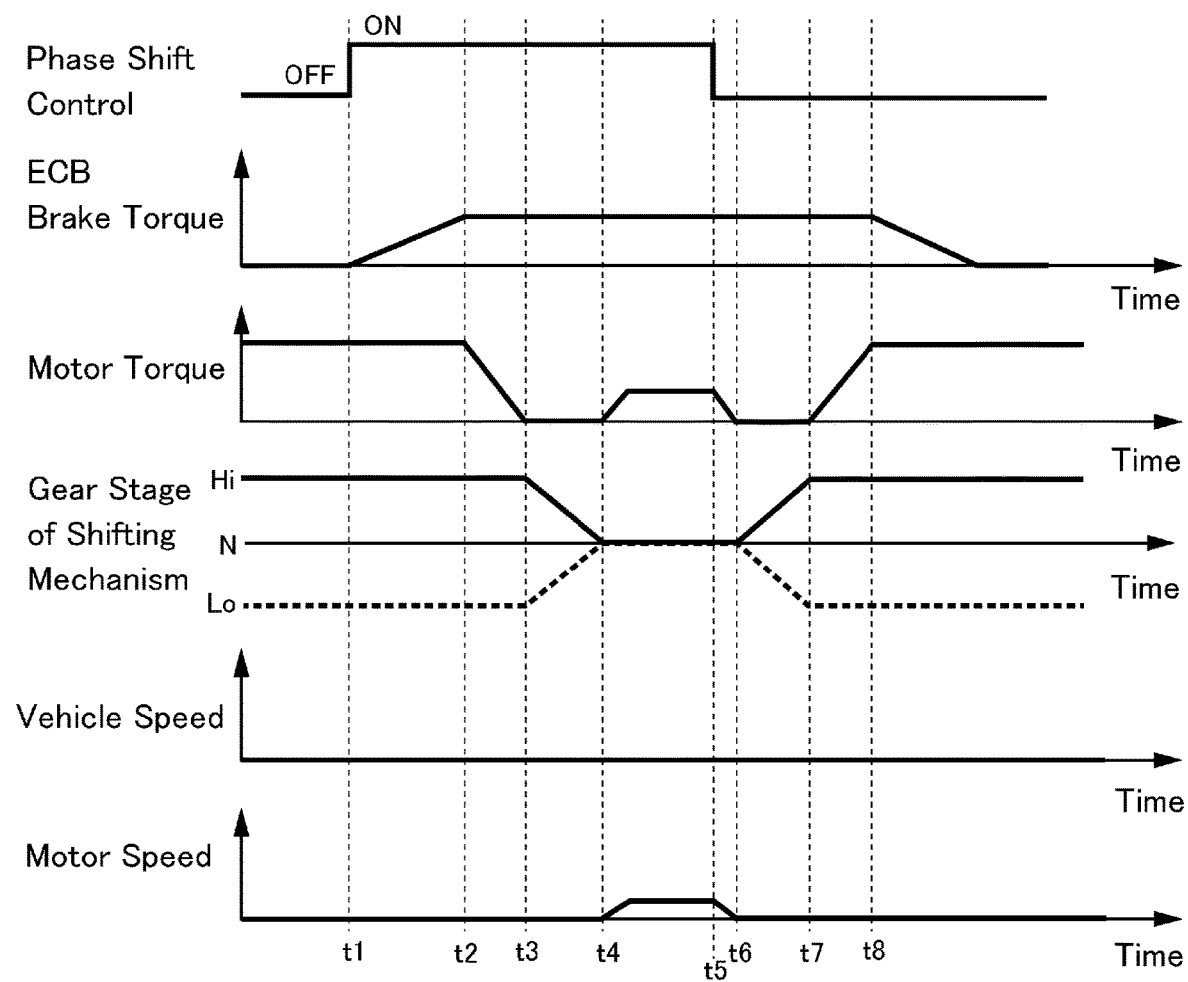
FIG. 13 is a time chart showing temporal changes in the above-mentioned parameters in the vehicle shown in FIG. 12 during execution of the routines shown in FIGS. 5 to 8.

FIG. 13 shows temporal changes in the execution flag of the phase shift control, a brake torque of the ECB 20, an output torque of the motor 22, the gear stage of the shifting mechanism 21, a vehicle speed, and a speed of the motor 22, in a case of stopping the vehicle Ve shown in FIG. 12 on an upslope by generating a reaction force to stop the vehicle Ve by the motor 22.

At point t1, the phase or the switching element of the motor 22 on which the thermal load is concentrated is identified, and hence the execution flag of the phase shift control is turned on. At the same time, the brake torque of the ECB 20 is increased to establish a reaction force against the backward movement of the vehicle Ve, instead of the motor 22.

When the brake torque of the ECB 20 is increased to a magnitude possible to stop the vehicle Ve on the slope at point t2, the output torque of the motor 22 is reduced gradually to zero to limit the thermal damage to the motor 22. When the torque of the motor 22 is reduced to zero at point t3, the gear stage of the shifting mechanism 21 is shifted from the high gear stage indicated by the solid line or the low gear stage indicated by the dashed-line to the neutral stage. When the gear stage of the shifting mechanism 21 is shifted to the neutral stage at point t4, the output torque of the motor 22 is increased gradually. In this situation, specifically, a rotational angle of the motor 22 is changed slightly to shift the energizing phase to another phase. When the energizing phase of the motor 22 is shifted to another phase, the execution flag of the phase shift control is turned off at point t5, and the output torque of the motor 22 is reduced gradually to zero.

Then, when the output torque of the motor 22 is reduced to zero at point t6, the gear stage of the shifting mechanism 21 is shifted from the neutral stage to the previous stage. When the gear stage of the shifting mechanism 21 is shifted to the previous stage at point t7, the torque of the motor 22 is increased to establish the reaction force to stop the vehicle Ve on the slope. In this situation, the vehicle Ve may be launched by further depressing the accelerator pedal.

When the torque of the motor 22 is increased to a predetermined magnitude at point t8, the brake torque of the ECB 20 is reduced gradually to zero. Note that the vehicle Ve is stopped on the slope in the situation shown in FIG. 13, therefore, the vehicle speed is not changed throughout the situation shown in FIG. 13. Similarly, although speed of the motor 22 is increased temporarily from point t4 to point t5 to shift the energizing phase, speed of the motor 22 is zero in the remaining period of time.

Thus, if the thermal load is concentrated on the specific phase in the motor 22 of the vehicle Ve shown in FIG. 12, the energizing phase is shifted to another phase thereby limiting the thermal damage to the motor 22. In addition, when shifting the energizing phase, the vehicle Ve can be stopped on the slope by establishing the reaction force to stop the vehicle Ve on the slope by the ECB 20. In this situation, since the torque of the motor 22 is reduced to zero, the motor 22 can be cooled during shifting the energizing phase.

When the accelerator pedal is further depressed to launch the vehicle Ve shown in FIG. 12 during execution of the phase shift control, the vehicle Ve will be launched after establishing a predetermined stage in the shifting mechanism 21. Therefore, it is preferable to notify the driver of execution of the phase shift control by an appropriate indicating means.

Although the above exemplary embodiments of the present disclosure have been described, it will be understood by those skilled in the art that the present disclosure should not be limited to the described exemplary embodiments, and various changes and modifications can be made within the scope of the present disclosure. For example, a friction clutch may be adopted as the clutch C2 instead of the dog clutch. In addition, in the vehicle Ve shown in FIG. 1, it is also possible to commence the routines shown in FIGS. 5 to 8 while engaging both of the clutches C1 and C2. In this case, the phase shift control may be executed for one of the motors 6 and 14 in which the thermal load is concentrated on a specific phase.

Further, the ECB 20 shown in FIG. 12 may also be arranged in the vehicle Ve shown in FIG. 1. In this case, if the thermal load is concentrated on a specific phase in the second motor 14, the ECB 20 and the first motor 6 may be controlled cooperatively to establish the reaction force to stop the vehicle Ve on a slope. That is, the output torque of the first motor 6 indicated in FIG. 10 may be reduced in an amount of the reaction force established by the ECB 20.

Furthermore, a possibility of thermal damage to the motor may also be determined based on a detection value of an electric energy or a heat quantity measured by a sensor, instead of comparing the integrated current value of the switching element to the threshold value α.

What is claimed is:
1. A control system for a vehicle comprising:
a first electric motor having a plurality of phases, that generates a torque by controlling a current value applied to each of the phases in accordance with a rotational angle;
an actuator that generates a torque to stop the vehicle; and
a selective transmission device that selectively transmits an output torque of the first electric motor to drive wheels and interrupts torque transmission between the first electric motor and the drive wheels,
wherein the control system comprises a controller that controls the actuator and the selective transmission device,
the controller is configured to execute a phase shift control to reduce a thermal load on a specific phase of the first electric motor by changing the rotational angle of the first electric motor, when the thermal load on the specific phase exceeds a threshold value as a result of generating the torque to stop the vehicle by the first electric motor while stopping a rotation of the first electric motor, and
the phase shift control is executed while interrupting torque transmission between the first electric motor and the drive wheels by the selective transmission device, and generating the torque to stop the vehicle by the actuator.

2. The control system for the vehicle as claimed in claim 1,
wherein the actuator includes a second electric motor, and the second electric motor generates the torque to stop the vehicle.

3. The control system for the vehicle as claimed in claim 2,
wherein selective transmission device includes a first clutch that is engaged to transmit the torque of the first electric motor to drive wheels, and that is disengaged to interrupt torque transmission between the first electric motor and the drive wheels,
the vehicle further comprises a second clutch that is engaged to transmit the torque of the second electric motor to drive wheels, and that is disengaged to interrupt torque transmission between the second electric motor and the drive wheels, and
the controller is further configured to execute the phase shift control while engaging the second clutch and disengaging the first clutch.

4. The control system for the vehicle as claimed in claim 2,
wherein the vehicle further comprises an engine connected to the second electric motor, and
the second electric motor stops the vehicle by generating a torque in an amount calculated by subtracting a friction torque of the engine from the torque required to stop the vehicle.

5. The control system for the vehicle as claimed in claim 4, wherein the controller is further configured to stop fuel supply to the engine during execution of the phase shift control.

6. The control system for the vehicle as claimed in claim 1, wherein the controller is further configured to control the selective transmission device to transmit the torque of the first electric motor to the drive wheels again after executing the phase shift control.

7. The control system for the vehicle as claimed in claim 1, wherein the threshold value of the thermal load includes a threshold value of an integrated current value of the first electric motor determined in accordance with a rotational angle of the first electric motor.

8. The control system for the vehicle as claimed in claim 7, wherein the controller is further configured to
compare a current integrated current value of the first electric motor to the threshold value, and
determine that the thermal load on the first electric motor is greater than the threshold value when the current integrated current value is greater than the threshold value.

9. The control system for the vehicle as claimed in claim 1,
wherein each of the phases individually includes a first switching element that controls a current value supplied to one of terminals, and a second switching element that controls a current value supplied to the other terminal, and
the threshold value is set based on a maximum allowable value of the thermal load on any one of the first switching element and the second switching element.

10. The control system for the vehicle as claimed in claim 9, wherein the phase shift control includes a control to adjust the rotational angle of the first electric motor such that a switching element to which the current is supplied is shifted between the first switching element and the second switching element.

* * * * *